(No Model.)
P. BRANDELL.
DEVICE FOR DISCHARGING LIQUIDS.
No. 553,276. Patented Jan. 21, 1896.
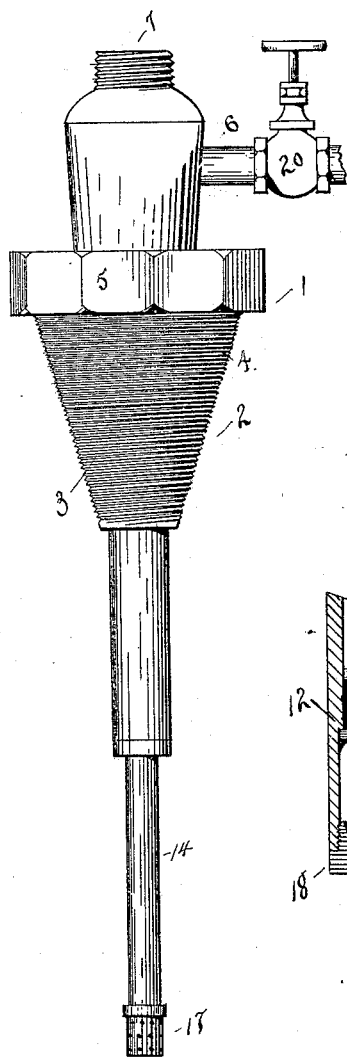
Fig. 1.
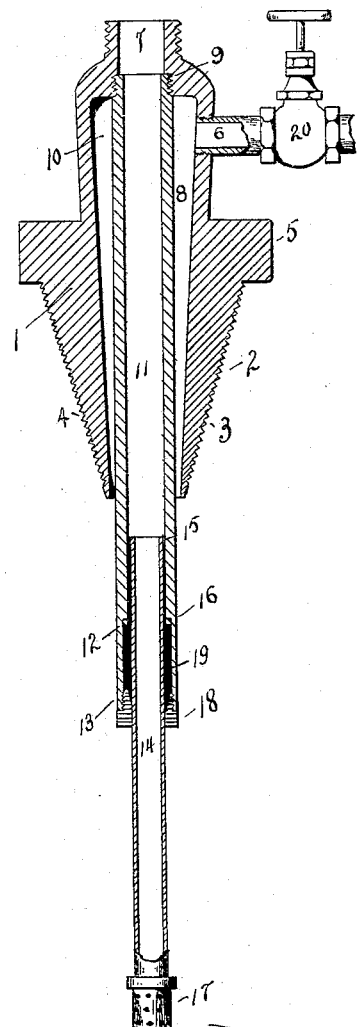
Fig. 2.
Fig. 3.
Witnesses:
Arthur Ashley
Geo. C. Hazelton, Jr.
Peter Brandell, Inventor,
by Edward Weaver, Att'y.

UNITED STATES PATENT OFFICE.

PETER BRANDELL, OF COUNCIL BLUFFS, IOWA.

DEVICE FOR DISCHARGING LIQUIDS.

SPECIFICATION forming part of Letters Patent No. 553,276, dated January 21, 1896.

Application filed March 30, 1895. Serial No. 543,845. (No model.)

*To all whom it may concern:*

Be it known that I, PETER BRANDELL, a citizen of the United States, residing at Council Bluffs, in the county of Pottawattamie and State of Iowa, have invented certain new and useful Improvements in Devices for Discharging Liquids, of which the following is a specification, reference being had therein to the accompanying drawings.

My invention relates to pumps for the transfer of oil from barrels or barrel-cars to tanks, or for purposes thereto closely allied. In explaining it I will make reference to the accompanying drawings, in all of which the same numeral refers to the same parts.

Figure 1 represents a perspective view of my device ready for use after the proper couplings have been made. Fig. 2 is a sectional view of Fig. 1 upon the central longitudinal line. Fig. 3 is a detail of construction that will hereinafter be properly noted.

1 represents the body portion of my device, the lower portion, 2, of which has a tapering exterior 3, provided with screw-threads 4, the use of which will be hereinafter described. The central portion of the body 1 is so formed upon its exterior 5 as to present a polygonal structure. The upper portion of the body 1 is provided with a horizontally-disposed nipple 6 and a vertically-disposed nipple 7. The interior of the body 1 is provided with a round passage 8 throughout its length, the said passage having internal threadings 9 near the orifice of nipple 7 and an annular enlarged portion 10, which tapers gradually to the lower orifice of the said passage 8. Into this passage 8 is inserted a tube 11, one end of which is threaded to engage threadings 9. It is particularly to be noted that this tube 11 is somewhat smaller in its exterior diameter than the lower orifice of the passage 8, so that when the tube is engaged, as described, there will remain a space between the said tube and the said orifice. The tube 11 is provided in its interior with an annular seat 12 and interior threadings 13 at its lower end. Into the tube 11 is fitted another tube 14, which is provided with a fixed guide-ring 15 at its end, a sliding guide-ring 16, and a perforated end portion 17. The tube 14 is secured into tube 11 by means of the threaded collar 18. It will be noticed that the guide-ring 15 clears the annular seat 12, but that guide-ring 16 does not.

Packing 19 is introduced to make tight joints, and the nipple 6 should be provided with a valve 20.

My device is operated as follows: The tapered portion 3 is inserted into the opening in the barrel or tank, and by means of the threads 4 is screwed in tightly. A coupling is made with nipple 7 to the tank to be filled. A coupling is made with nipple 6 to a pump or other supply of air-pressure. In screwing the apparatus into the barrel it will be noticed that the form 5 renders the application of a wrench easy. When the couplings are completed, the valve 20 being open, a proper air-pressure enters the barrel through nipple 6 and enlarged portion 10 of passage 8 into the said barrel. This forces the oil through perforated strainer 17, tube 14, tube 11, nipple 7, and through coupled connections to the tank or reservoir desired.

Having described my apparatus, I will define the matter for which I claim Letters Patent as follows:

A liquid discharging apparatus comprising a tapered body portion with exterior screw threads, a vertical opening through the same, said opening having an interior enlarged tapering chamber 10, a main liquid tube traversing said opening and engaging by screw threads the upper portion thereof, a compressed air inlet to said tapering chamber, a secondary liquid tube telescoped within the said main liquid tube and having fixed at its upper end a guide ring and to its lower end a strainer device, a sliding guide ring between the main liquid tube and the secondary liquid tube, and a threaded thimble retaining said secondary liquid tube within the said main liquid tube with packing for said thimble, substantially as described.

In testimony whereof I affix my signature in presence of two witnesses.

PETER BRANDELL.

Witnesses:
FRANK HERMES,
PHILLIP MERGEN.